United States Patent [19]
Park et al.

[11] Patent Number: 5,902,514
[45] Date of Patent: May 11, 1999

[54] MAGNETIC CERAMIC COMPOSITION FOR USE IN MICROWAVE DEVICES, MAGNETIC CERAMICS FOR USE IN MICROWAVE DEVICES, AND PREPARATION METHOD THEREFOR

[75] Inventors: Jung-Rae Park; Tae-Hong Kim; Sang-Seok Lee; Tae-Goo Choy, all of Daejeon, Rep. of Korea

[73] Assignees: Electronics and Telecommunications Research Institute, Daejeon; Korea Telecom, Seoul, both of Rep. of Korea

[21] Appl. No.: 08/903,773

[22] Filed: Jul. 31, 1997

[30] Foreign Application Priority Data

Oct. 31, 1996 [KR] Rep. of Korea .................. 96-50774

[51] Int. Cl.⁶ .................................................. C04B 35/26
[52] U.S. Cl. .............................. 252/62.57; 252/62.63; 252/62.58
[58] Field of Search ........................ 252/62.57, 62.63, 252/62.58

[56] References Cited

U.S. PATENT DOCUMENTS

| | | | |
|---|---|---|---|
| 3,006,855 | 10/1961 | Geller | 252/62.57 |
| 3,657,131 | 4/1972 | Lagrange et al. | 252/62.57 |
| 3,886,077 | 5/1975 | Nicolas et al. | 252/62.57 |
| 5,589,096 | 12/1996 | Konoike et al. | 252/62.57 |

*Primary Examiner*—Melissa Koslow
*Attorney, Agent, or Firm*—Jacobson, Price, Holman & Stern, PLLC

[57] ABSTRACT

A material for microwave band devices used by the general people and in industrial electronic apparatuses is disclosed. Particularly, a magnetic ceramic composition for use in microwave devices, a magnetic ceramics for use in microwave devices and a preparation method therefore are disclosed, in which the saturation magnetization can be easily controlled, and a low ferri-magnetic resonance half line width and an acceptable curie temperature are ensured. The magnetic ceramic composition for microwave devices includes yttrium oxide ($Y_2O_3$), iron oxide ($Fe_2O_3$), tin oxide ($SnO_2$), aluminum oxide ($Al_2O_3$) and a calcium supply source. The magnetic ceramics for the microwave devices are manufactured by carrying out a forming and a sintering after mixing: yttrium oxide, iron oxide, tin oxide, aluminum oxide and calcium carbonate (or calcium oxide) based on a formula shown below. It has a saturation magnetization of 100–1,800 G at the normal temperature, a temperature coefficient for the saturation magnetization of 0.2%/°C., and a ferri-magnetic resonance half line width of less than 60 Oe, $Y_{3-x}Ca_{x/2}Sn_{x/2}Fe_{5-y}Al_yO_{12}$ where $0.1 \leq x \leq 1$, and $0.1 \leq y \leq 1.5$.

2 Claims, No Drawings

MAGNETIC CERAMIC COMPOSITION FOR USE IN MICROWAVE DEVICES, MAGNETIC CERAMICS FOR USE IN MICROWAVE DEVICES, AND PREPARATION METHOD THEREFOR

BACKGROUND OF THE INVENTION

1. Field of the Invention

The present invention relates to a material for use in microwave band devices which are used by the general people and in industrial electronic apparatuses. Particularly, the present invention relates to a magnetic ceramic composition for use in microwave devices, a magnetic ceramics for use in microwave devices and a preparation method therefor, in which the saturation magnetization can be easily controlled, and a low ferri-magnetic resonance half line width and an acceptable curie temperature are ensured.

2. Description of the Prior Art

Recently, in accordance with the universal use of the communication means such as car phones, portable phones, cordless phones, and satellite broadcasting receiver, there have been much progresses in the microwave circuits and integrated circuits. Accordingly, the trend is that magnetic ceramics are widely used in microwave devices such as isolators, circulators, S/N enhancers and the like.

Such magnetic ceramics for microwave devices are used mostly in isolators and circulators. The conventional typical magnetic ceramics are YIG ($Y_3Fe_5O_{12}$), Ni-Zn ferrites, Mn-Mg ferrites and Li ferrites.

Meanwhile, if the magnetic ceramics for the microwave devices is to be applied to the microwave band components such as isolators and circulators, a proper saturation magnetization in which adjustments should be possible in a range of 100–1,800 G should be ensured. Further, in the microwave band, the ferri-magnetic resonance half line width should be as low as 60 Oe, and the temperature coefficient for the saturation magnetization should be as low as 0.2%/°C. If the temperature coefficient for the saturation magnetization is high, a temperature stability cannot be obtained, and if the ferri-magnetic resonance half line width is high, the loss characteristics in the microwave band is aggravated.

However, among the conventional magnetic ceramics for the microwave devices, the YIG series show a proper saturation magnetization, a low ferri-magnetic resonance half line width, but a relatively high temperature coefficient of 0.3–0.4%/°C. for the magnetic saturation.

Meanwhile, in the case of the Ni-Zn ferrites and the Mn-Mg ferrites, the saturation magnetization is high, and the temperature coefficient is relatively low, but the ferri-magnetic resonance half line width is as high as 160 Oe.

Meanwhile, in the case of the Li ferrites, the saturation magnetization is proper, and the temperature coefficient is low, but the ferri-magnetic resonance half line width is as high as 300 Oe.

Therefore, the above described conventional magnetic ceramics for the microwave devices have practical problems in applying to the microwave band components. Further, during the preparation of the magnetic ceramics, there are used expensive raw materials such as yttrium oxide, iron oxide and the like, with the result that the economy is aggravated.

SUMMARY OF THE INVENTION

The present invention is intended to overcome the above described disadvantages of the conventional techniques.

Therefore it is an object of the present invention to provide a ceramic composition for use in microwave devices, in which controls are easy, a proper saturation magnetization is ensured, a low ferri-magnetic resonance half line width in the microwave band is ensured, the temperature coefficient for the saturation magnetization is low, a stable ingredient ratio is ensured, and the manufacturing economy is acceptable.

It is another object of the present invention to provide a magnetic ceramics and a preparation method therefor, in which the control is easy, a proper saturation magnetization is ensured, a low ferri-magnetic resonance half line width in the microwave band is ensured, the temperature coefficient for the saturation magnetization is low, and an actual application to the microwave band components is possible.

In achieving the above objects, the magnetic ceramic composition for microwave devices includes yttrium oxide ($Y_2O_3$), iron oxide ($Fe_2O_3$), tin oxide ($SnO_2$), aluminum oxide ($Al_2O_3$) and a calcium supply source, and is defined as follows.

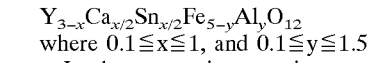
$Y_{3-x}Ca_{x/2}Sn_{x/2}Fe_{5-y}Al_yO_{12}$
where $0.1 \leq x \leq 1$, and $0.1 \leq y \leq 1.5$ In the magnetic ceramic composition according to the present invention, the calcium supply source may be calcium carbonate ($CaCO_3$) or calcium oxide (CaO). In the case of calcium oxide, a ball milling process may be applied during the preparation of the magnetic ceramic composition for the microwave devices, so that a uniform mixing can be realized.

The magnetic ceramics for the microwave devices are manufactured by carrying out a forming and a sintering after mixing: yttrium oxide, iron oxide, tin oxide, aluminum oxide and calcium carbonate (or calcium oxide) based on a formula shown below. It has a saturation magnetization of 100–1,800 G at the normal temperature, a temperature coefficient for the saturation magnetization of 0.2%/°C., and a ferri-magnetic resonance half line width of less than 60 Oe.

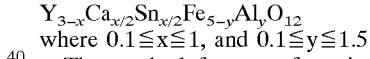
$Y_{3-x}Ca_{x/2}Sn_{x/2}Fe_{5-y}Al_yO_{12}$
where $0.1 \leq x \leq 1$, and $0.1 \leq y \leq 1.5$ The method for manufacturing magnetic ceramics for microwave devices includes the steps of:

mixing yttrium oxide, iron oxide, tin oxide, aluminum oxide and calcium carbonate (or calcium oxide) to form a mixture based on a formula shown below;

drying the mixture, and carrying out a calcination at a temperature of 1,100–1,200° C. for 1–3 hours to form a calcinated powder;

adding a binder to the calcinated powder, and forming it into a shaped object; and sintering the shaped object at a temperature of 1,300–1,500° C. under an air atmosphere:

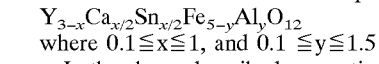
$Y_{3-x}Ca_{x/2}Sn_{x/2}Fe_{5-y}Al_yO_{12}$
where $0.1 \leq x \leq 1$, and $0.1 \leq y \leq 1.5$ In the above described magnetic ceramic composition for microwave devices, if the substitution amount of aluminum oxide for iron oxide is increased, the saturation magnetization of the magnetic ceramics for microwave devices is decreased. However, if the substitution amount is more than 1.5 moles, then the saturation magnetization is decreased, and the ferri-magnetic resonance half line width is steeply increased, with the result that the practical use becomes impossible.

Further, in the composition of the present invention, tin oxide and the calcium supply source are in a substitutional relationship. As the substitutional amount between tin oxide and the calcium supply source is increased, the ferri-magnetic resonance half line width is decreased, and the temperature coefficient for the saturation magnetization is also decreased, as well as the optimum sintering temperature becomes low. But, if the substitution is made by more than one mole, the saturation magnetization is decreased, but the ferri-magnetic resonance half line width is increased.

DETAILED DESCRIPTION OF THE PREFERRED EMBODIMENT

The magnetic ceramic composition for use in microwave devices, the magnetic ceramics for use in microwave devices and the manufacturing method therefor will be described in detail below based on an actual example.

This example is presented for describing the present invention in a specific manner, and therefore, it will be apparent to those ordinarily skilled in the art that the present invention will not be limited by the presented example.

EXAMPLE

First, yttrium oxide, iron oxide, tin oxide, aluminum oxide and calcium carbonate (or calcium oxide) were weighed as shown in Table 1 below, and they were mixed together with de-ionized water. The mixing was carried out by applying a ball milling method, and in carrying out the mixing, zirconia balls and a plastic bottle were used.

After completing the mixing, the mixture was dried, and the dried powder was made to undergo a calcination at a temperature of 1,100–1,200° C. for 2 hours. Then a proper amount of polyvinyl alcohol as a binder was added to the calcinated powder, and then, a mixing was carried out within a zirconia mortar.

The mixed material was fabricated into a disc shaped test piece having a diameter of 10 mm and a height of 3 mm by using a hydraulic press and a die. Under this condition, the fabricating pressure was above 1.0 ton/cm$^2$.

Then the fabricated test piece was formed into a spherical shape. Then it was mounted on a zirconia setter, and then, a sintering was carried out at a temperature of over 1,300° C. by using an electric furnace.

Evaluation of Material Properties

For the magnetic ceramic test piece for use in microwave devices which was obtained through the above described process, the saturation magnetization and the saturation magnetization versus the variation of temperature were measured by using a vibrating sample magnetometer. Further, the ferri-magnetic resonance half line width was measured by applying magnetic field at 10 GHz frequency based on a cavity perturbation method.

Further, the temperature coefficient of the saturation magnetization was obtained for a range of 25–125° C. based on an equation shown below and based on a saturation magnetization at 25° C.

$$\alpha = \frac{4\pi Ms(125°\,C.) - 4\pi Ms(25°\,C.)}{4\pi Ms(25°\,C.)\Delta T}$$

where α is the temperature coefficient of the saturation magnetization, 4πMs(125° C.) is the saturation magnetization at 125° C., 4πMs(25° C.) is the saturation magnetization at 25° C., and ΔT is the measured temperature difference (in this case, 125° C.–25° C.=100° C.).

For the magnetic ceramics for use in microwave devices according to the present invention, the saturation magnetization, the ferri-magnetic resonance half line width and the temperature coefficient of the saturation magnetization are shown in Table 1 below.

TABLE 1

| Test piece No. | Composition (mole) x | y | Sintering condition Temp (°C.) | Hour (H) | Magnetic Saturation (4 nMS) (G) | Ferri-magnetic resonance width(Oe) | Temp. Coefficient (Saturation) (%/° C.) |
|---|---|---|---|---|---|---|---|
| 1 | 0.1 | 1.48 | 1,425 | 3 | 337 | 58 | 0.3 |
| 2 | 0.1 | 0.2 | 1,475 | 3 | 1,782 | 59 | 0.16 |
| 3 | 0.15 | 1.3 | 1,425 | 3 | 477 | 56 | 0.28 |
| 4 | 0.24 | 1.27 | 1,425 | 3 | 486 | 55 | 0.27 |
| 5 | 0.3 | 1.33 | 1,400 | 4 | 512 | 48 | 0.25 |
| 6* | 0.3 | 1.33 | 1,400 | 4 | 508 | 49 | 0.24 |
| 7 | 0.46 | 1.05 | 1,350 | 4 | 688 | 46 | 0.18 |
| 8* | 0.46 | 1.05 | 1,350 | 4 | 694 | 48 | 0.20 |
| 9 | 0.57 | 0.96 | 1,350 | 4 | 723 | 52 | 0.12 |
| 10 | 0.62 | 0.98 | 1,350 | 4 | 802 | 56 | 0.13 |
| 11 | 0.68 | 0.65 | 1,350 | 5 | 812 | 60 | 0.16 |
| 12 | 0.72 | 0.54 | 1,350 | 5 | 856 | 52 | 0.16 |
| 13 | 0.74 | 0.58 | 1,350 | 5 | 842 | 56 | 0.17 |
| 14 | 0.82 | 0.34 | 1,350 | 5 | 886 | 52 | 0.11 |
| 15 | 0.88 | 0.32 | 1,325 | 5 | 1,051 | 52 | 0.13 |
| 16 | 0.91 | 1.44 | 1,350 | 5 | 107 | 59 | 0.19 |
| 17 | 0.91 | 0.23 | 1,325 | 5 | 1,081 | 50 | 0.13 |
| 18 | 1.0 | 0.22 | 1,300 | 6 | 1,206 | 58 | 0.14 |

*Calcium oxide was used instead of calcium carbonate as the calcium supply source.

As can be seen in Table 1 above, in the magnetic ceramic composition for microwave devices according to the present invention, in accordance with the increase in the substitution amount of aluminum oxide for iron oxide, the saturation magnetization was decreased, and the ferri-magnetic resonance half line width was first decreased and then increased. The optimum composition ratio of aluminum oxide could be varied in accordance with the substitution amount of calcium carbonate and tin oxide, and the property values showed the proper level within a range of 0.3–1.5 moles.

Further, among the compositions of the present invention, in accordance with the increase in the substitution amount of calcium carbonate and tin oxide for yttrium oxide, the optimum sintering temperature was lowered, the ferri-magnetic resonance half line width was decreased, and the temperature coefficient of the saturation magnetization was lowered. However, if the substitution is made by more than 1 mole, the saturation magnetization was decreased, but the ferri-magnetic resonance half line width was increased.

Further, as can be seen in Table 1 above, even if calcium oxide was used instead of calcium carbonate as the calcium supply source, there was no much variation in the saturation magnetization, in the ferri-magnetic resonance half line width, and in the temperature coefficient of the saturation magnetization.

Meanwhile, in a same composition, if the sintering temperature was raised, the saturation magnetization of the sintered object was slightly increased, while if the sintering time period was extended, then the ferri-magnetic resonance half line width was slightly decreased.

According to the present invention as described above, there is obtained a magnetic ceramics for use in microwave devices, in which, at the normal temperature, a magnetic saturation of 100–1,800 G, a temperature coefficient for the saturation magnetization of 0.2%/° C., and a ferri-magnetic resonance half line width of 60 Oe are ensured, and in which a proper saturation magnetization, a smooth temperature stability and a superior loss characteristics are provided. Therefore, the magnetic ceramics for use in microwave devices according to the present invention can be advantageously used in manufacturing the microwave band components such as the microwave band isolators, the circulators, and the S/N enhancers.

Further, in the present invention, the expensive yttrium oxide and iron oxide are combined with the cheap tin oxide, aluminum oxide and calcium carbonate (or calcium oxide) as the raw materials. Therefore, a magnetic ceramics for high prestige microwave devices can be provided.

What is claimed is:

1. A magnetic ceramics for use in microwave devices, comprising: yttrium oxide, iron oxide, tin oxide, aluminum oxide and calcium oxide, based on a formula:

$Y_{3-x}Ca_{x/2}Sn_{x/2}Fe_{5-y}Al_yO_{12}$ where $0.1 \leq x \leq 1$, and $0.1 \leq y \leq 1.5$.

2. A method for manufacturing a magnetic ceramics for microwave devices, comprising the steps of:

mixing yttrium oxide, iron oxide, tin oxide, aluminum oxide and calcium supply source to form a mixture based on a formula shown below;

drying the mixture, and carrying out a calcination at a temperature of 1,100–1,200° C. for 1–3 hours to form a calcinated powder;

adding a binder to the calcinated powder, and forming it into a shaped object; and sintering the shaped object at a temperature of 1,300–1,500° C. under an air atmosphere:

$Y_{3-x}Ca_{x/2}Sn_{x/2}Fe_{5-y}Al_yO_{12}$ where $0.1 \leq x \leq 1$, and $0.1 \leq y \leq 1.5$.

* * * * *